US012636629B2

(12) United States Patent
Li

(10) Patent No.: US 12,636,629 B2
(45) Date of Patent: May 26, 2026

(54) LID DEVICE OF VERTICAL CUTTER MIXER

(71) Applicant: TAIYI FOOD MACHINERY CO. LTD., Taichung City (TW)

(72) Inventor: Ying-Hung Li, Taichung City (TW)

(73) Assignee: Taiyi Food Machinery Co. Ltd., Taichung City (TW)

(*) Notice: Subject to any disclaimer, the term of this patent is extended or adjusted under 35 U.S.C. 154(b) by 48 days.

(21) Appl. No.: 18/980,024

(22) Filed: Dec. 13, 2024

(65) Prior Publication Data

US 2026/0021462 A1 Jan. 22, 2026

(30) Foreign Application Priority Data

Jul. 18, 2024 (TW) ................................ 113126850

(51) Int. Cl.
*B01F 35/45* (2022.01)

(52) U.S. Cl.
CPC .................................. *B01F 35/451* (2022.01)

(58) Field of Classification Search
CPC .... B01F 35/451; B01F 27/808; B01F 35/453; B65D 45/20; B65D 45/02; B65D 45/04; B65D 45/06; B65D 45/16; B65D 45/22; B65D 45/24; F16J 13/16; F16J 13/18; F16J 13/20
USPC .......................................................... 220/250
See application file for complete search history.

(56) References Cited

U.S. PATENT DOCUMENTS 4,234,221 A * 11/1980 Przybylinski ............ F16J 13/18 292/210
10,550,940 B2 * 2/2020 Kozak ........................ E06B 5/12
2018/0163874 A1 * 6/2018 Euwer .................... F16K 1/2028
2025/0314297 A1 * 10/2025 Segert ................. E05B 17/0033

* cited by examiner

*Primary Examiner* — Andrew D Perreault
(74) *Attorney, Agent, or Firm* — Rosenberg, Klein & Lee

(57) ABSTRACT

A lid device of a vertical cutter mixer has a lid body, a support member and at least one linking member. The lid body has a holder. The support member is pivotably connected to a side stand. Each linking member is disposed between the lid body and the support member, is pivotably connected to the holder via a first pivot member, and is pivotably connected to the support member via a second pivot member. When the lid device pivots to close, the lid body is subjected to gravity to swing relative to the support member and contacts a barrel edge of a mixing barrel almost horizontally. The lid device can be subjected to a uniform force during closing.

18 Claims, 6 Drawing Sheets

LID DEVICE OF VERTICAL CUTTER MIXER

BACKGROUND OF THE INVENTION

1. Field of the Invention

The present invention relates to a food processor, and more particularly to a lid device of a vertical cutter mixer adapted to chop and stir food ingredients.

2. Description of Related Art

A vertical cutter mixer is mainly configured to chop food ingredients and stir the food ingredients for mixing. With reference to FIG. 6, a conventional vertical cutter mixer 90 mainly comprises a side stand 91, a mixing barrel 92, a tumbling base 94, and a lid device 93. The mixing barrel 92 is located at a side of the side stand 91 and is connected to and disposed above the tumbling base 94. The tumbling base 94 is rotatable relative to the side stand 91 around a horizontal tumbling shaft. A driving device is disposed in the tumbling base 94. A blade set is disposed in the mixing barrel 92 and is connected to the driving device. The blade set can be driven by the driving device to chop and stir food ingredients within the mixing barrel 92. The lid device 93 is openable, is disposed at a top of the mixing barrel 92, and is pivotably connected to the side stand 91.

The lid device 93 comprises a lid body 931, two sets of fixing posts 932, and a connecting arm set 933. The connecting arm set 933 includes two beams 935, a pivot shaft 934, and an engaging part 936. The two beams 935 are arranged side by side and respectively extend through the two sets of the fixing posts 932 to be secured on the lid body 931. The pivot shaft 934 is disposed at ends of the two beams 935 and is connected to the side stand 91. The engaging part 936 is disposed at opposite ends of the two beams 935 and is configured to be connected with a buckle disposed on the mixing barrel 92. A user may hold the connecting arm set 933 to pivot the lid device 93 around the pivot shaft 934 to open or close the lid device 93.

Since the connecting arm set 933 is secured to the lid body 931 via the two sets of the fixing posts 932 and is pivotably connected to the side stand 91 via the pivoting shaft 934, the lid body 931 is pivotable with the connecting arm set 933 during closing of the lid device 93. Whereby, a side of the lid body 931 adjacent to the side stand 91 contacts a barrel edge of the mixing barrel 92 earlier than a side of the lid body 931 away from the side stand 91. Consequently, during closing of the lid device 93, the lid body 931 is likely subjected to an nonuniform force and is difficult to be aligned with an opening of the mixing barrel 92. As a result, closing tightness of the lid device 93 is reduced. During closing, the side of the lid body 931 adjacent to the side stand 91 will be subjected to a larger pressing force and is easily worn.

To overcome the shortcomings, the present invention provides a lid device of a vertical cutter mixer to mitigate or obviate the aforementioned problems.

SUMMARY OF THE INVENTION

The main objective of the present invention is to provide a lid device of a vertical cutter mixer. During closing of the lid device, a lid body of the lid device may be subjected to a uniform force to enhance closing tightness of the lid device.

The lid device of the vertical cutter mixer is configured to close a top of a mixing barrel and is configured to be pivotably connected to a side stand next to the mixing barrel. The lid device comprises a lid body comprising a holder at a top of the lid body, a support member configured to be pivotably connected to the side stand via an end of the support member, and at least one linking member disposed between the lid body and the support member. Wherein, each of the at least one linking member is connected to the holder via a first pivot member and is pivotable relative to the holder around the first pivot member. Each of the at least one linking member is connected to the support member via a second pivot member and is pivotable relative to the support member around the second pivot member.

Other objects, advantages, and novel features of the invention will become more apparent from the following detailed description when taken in conjunction with the accompanying drawings.

DETAILED DESCRIPTION OF PREFERRED EMBODIMENTS

Figure 1:
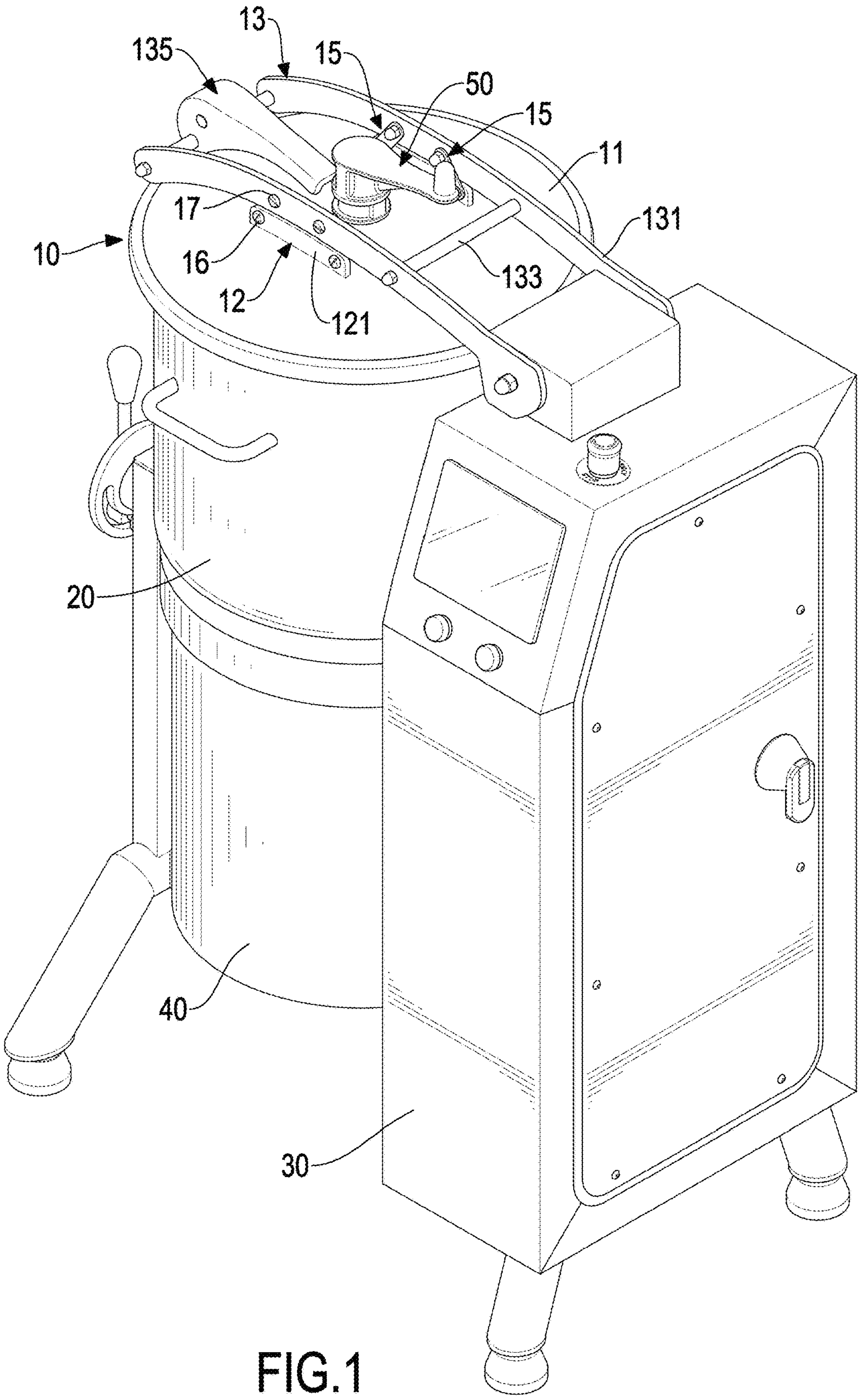
FIG. 1 is a perspective view showing that a lid device of a vertical cutter mixer in accordance with the present invention is assembled to a vertical cutter mixer.
Figure 2:
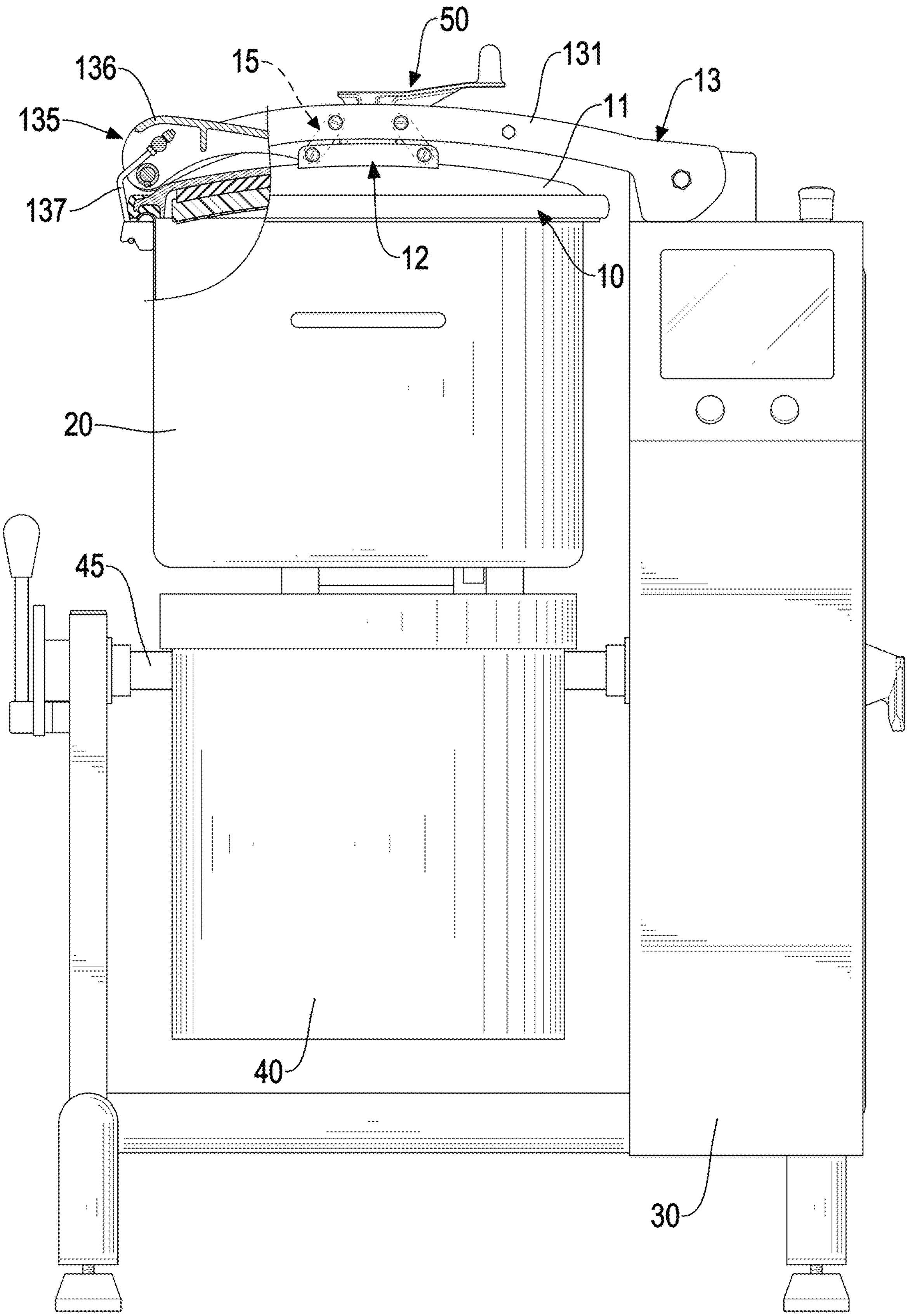
FIG. 2 is a side view in partial section of the lid device in FIG. 1.
Figure 3:
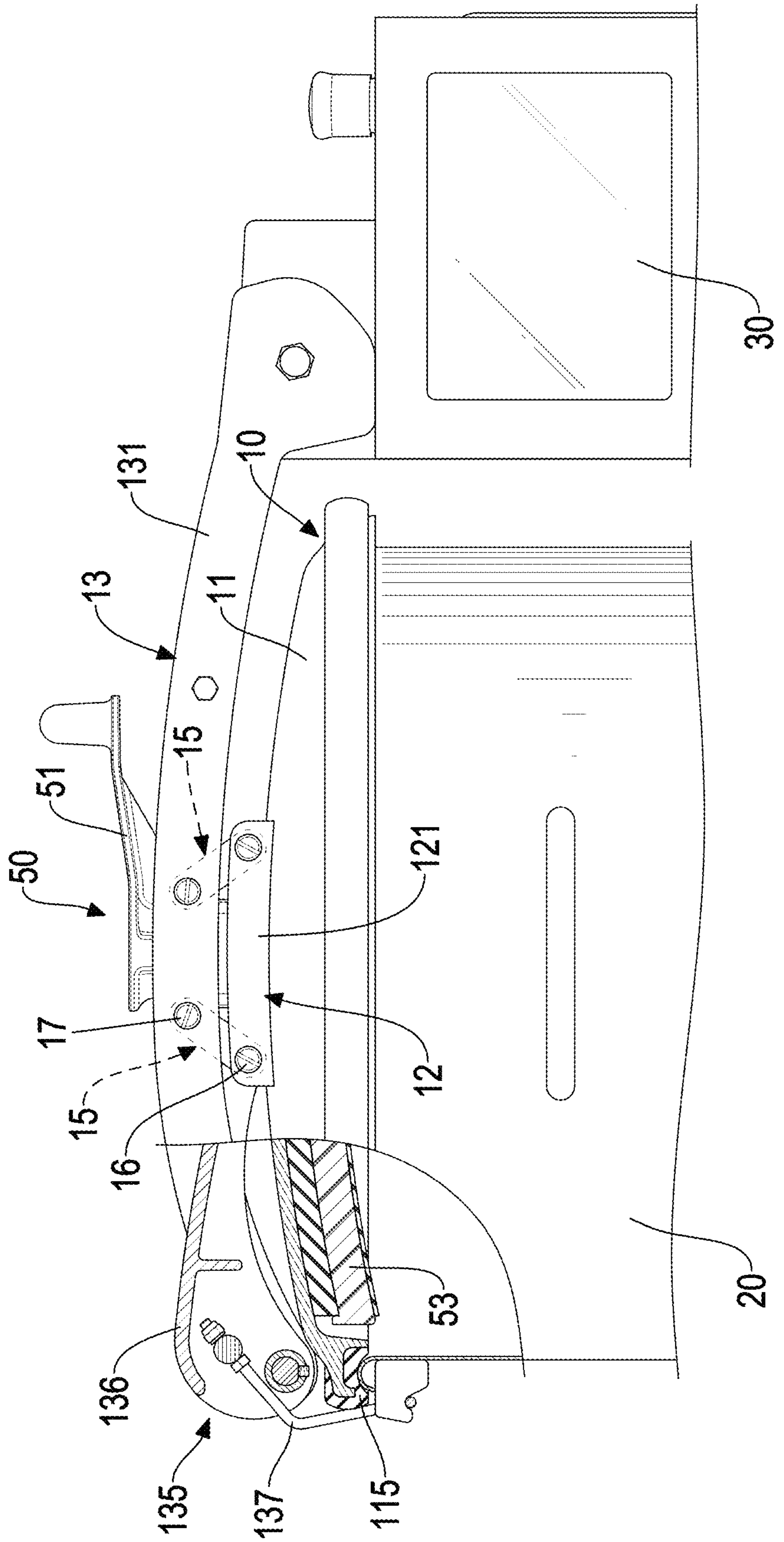
FIG. 3 is an enlarged side view in partial section of the lid device in FIG. 1.

With reference to FIGS. 1 to 3, a lid device 10 of a vertical cutter mixer in accordance with the present invention is configured to close a top of a mixing barrel 20 and is configured to be pivotably connected to a side stand 30 next to the mixing barrel 20. The side stand 30 is located at a side of the mixing barrel 20. The mixing barrel 20 is connected to and is disposed above a tumbling base 40. The tumbling base 40 is rotatable relative to the side stand 30 around a horizontal tumbling shaft 45. A driving device is disposed in the tumbling base 40. A blade set is disposed in the mixing barrel 20 and is connected to the driving device. The blade set can be driven by the driving device to chop and stir food ingredients within the mixing barrel 20.

With reference to FIGS. 1 to 5, the lid device 10 comprises a lid body 11, a support member 13, and at least one linking member 15. The lid body 11 comprises a holder 12 at a top of the lid body 11. The support member 13 is disposed above the lid body 11, and is configured to be pivotably connected to the side stand 30 via an end of the support member 13. Each linking member 15 is disposed between the lid body 11 and the support member 13, is pivotably connected to the holder 12 via a first pivot member 16, and is pivotably connected to the support member 13 via a second pivot member 17. Each linking member 15 is pivotable relative to the holder 12 around the first pivot member 16 and is pivotable relative to the support member 13 around the second pivot member 17.

The at least one linking member 15 may comprise multiple linking members 15 spaced apart from one another, so a stable connection of the lid body 11 and the support member 13 can be provided with the multiple linking members 15. Preferably, the at least one linking member 15 comprises two linking members 15 arranged along the support member 13 at a spaced interval. A first distance between two ends of the two linking members 15 connected to the support member 13 is smaller than a second distance between two ends of the two linking member 15 connected to the holder 12. Specifically, the at least one linking member 15 comprises four linking members 15 divided into two sets in a side-by-side arrangement. Each set includes two of the linking members 15 arranged along the support member 13.

The holder 12 may have multiple first through holes 122 spaced apart from one another. The support member 13 may have multiple second through holes 132 spaced apart from one another. Each linking member 15 has a first connecting hole 151 and a second connecting hole 152 spaced apart each other. Each linking member 15 is pivotably connected to the holder 12 via the first pivot member 16 extending through the first connecting hole 151 and one of the first through holes 122 of the holder 12. Each linking member 15 is pivotably connected to the support member 13 via the second pivot member 17 extending through the second connecting hole 152 of the linking member 15 and one of the second through holes 132 of the support member 13. A distance between each adjacent two first through holes 122 is larger than a distance between each adjacent two second through holes 132. Therefore, the first distance between the two ends of the two linking members 15 connected to the support member 13 is smaller than the second distance between the two ends of the two the linking members 15 connected to the holder 12.

Specifically, the holder 12 comprises two mounting plates 121 extending parallel to the support member 13 and laterally spaced apart from each other. The support member 13 comprises two supporting arms 131 extending away from the side stand 30 and laterally spaced apart from each other. Each mounting plate 121 is connected to a respective one of the two supporting arms 131 via two of the linking members 15 arranged along the support member 13 at a spaced interval. Each mounting plate 121 has two said first through holes 122 formed therethrough and arranged along the support member 13. Each supporting arm 131 has two second through holes 132 formed therethrough and arranged along the support member 13. The distance between the two second through holes 132 is smaller than the distance between the two first through holes 122. Each of the linking members 15 is pivotably connected to one of the mounting plates 121 via the first pivot member 16 extending through the first connecting hole 151 of the linking member 15 and one of the first through holes 122 at the mounting plate 121. Each of the linking members 15 is pivotably connected to one of the two supporting arms 131 via the second pivot member 17 extending through the second connecting hole 152 of the linking member 15 and one of the second through holes 132 at the supporting arm 131. When the mixing barrel 20 is closed by the lid body 11, the two linking members 15 are inclined downwardly and gradually away from each other.

Furthermore, the support member 13 may comprises a fastening member 135 which is connected to the two supporting arms 131, is disposed at an end of the support member 13 away from the side stand 30, and is configured to be detachably connected with a clasp disposed on the mixing barrel 20. The fastening member 135 comprises a handle 136 pivotably connected to the two supporting arms 131 and a hook 137 connected to an end of the handle 136. The hook 137 may be a U-shaped metallic rod and is flexible. The hook 137 is configured to hook on the clasp of the mixing barrel 20, and is fastened or loosened by pivoting the handle 136. The support member 13 further comprises a transverse rod 133 supporting between the two supporting arms 131 and disposed between the side stand 30 and the fastening member 135 to increase the structural strength of the support member 13.

The lid device 10 further comprises a sealing member 115 connected to and surrounding a rim of the lid body 11. When the lid device 10 is closed, the sealing member 115 is tightly clamped between a barrel edge of the mixing barrel 20 and the lid body 11 to seal the mixing barrel 20. The sealing member 115 may be made of silicone.

A scraping device 50 is connected to the lid device 10 and comprises a rotating handle 51 and a scraper 53. The rotating handle 51 is disposed above the lid body 11 and is rotatable relative to the lid body 11. The scraper 53 is disposed below the lid body 11 and is connected to the rotating handle 51 to be driven to rotate relative to the lid body 11 to scrape the food ingredients attached to a bottom of the lid body 11 or an internal peripheral surface of the mixing barrel 20.

Figure 4:
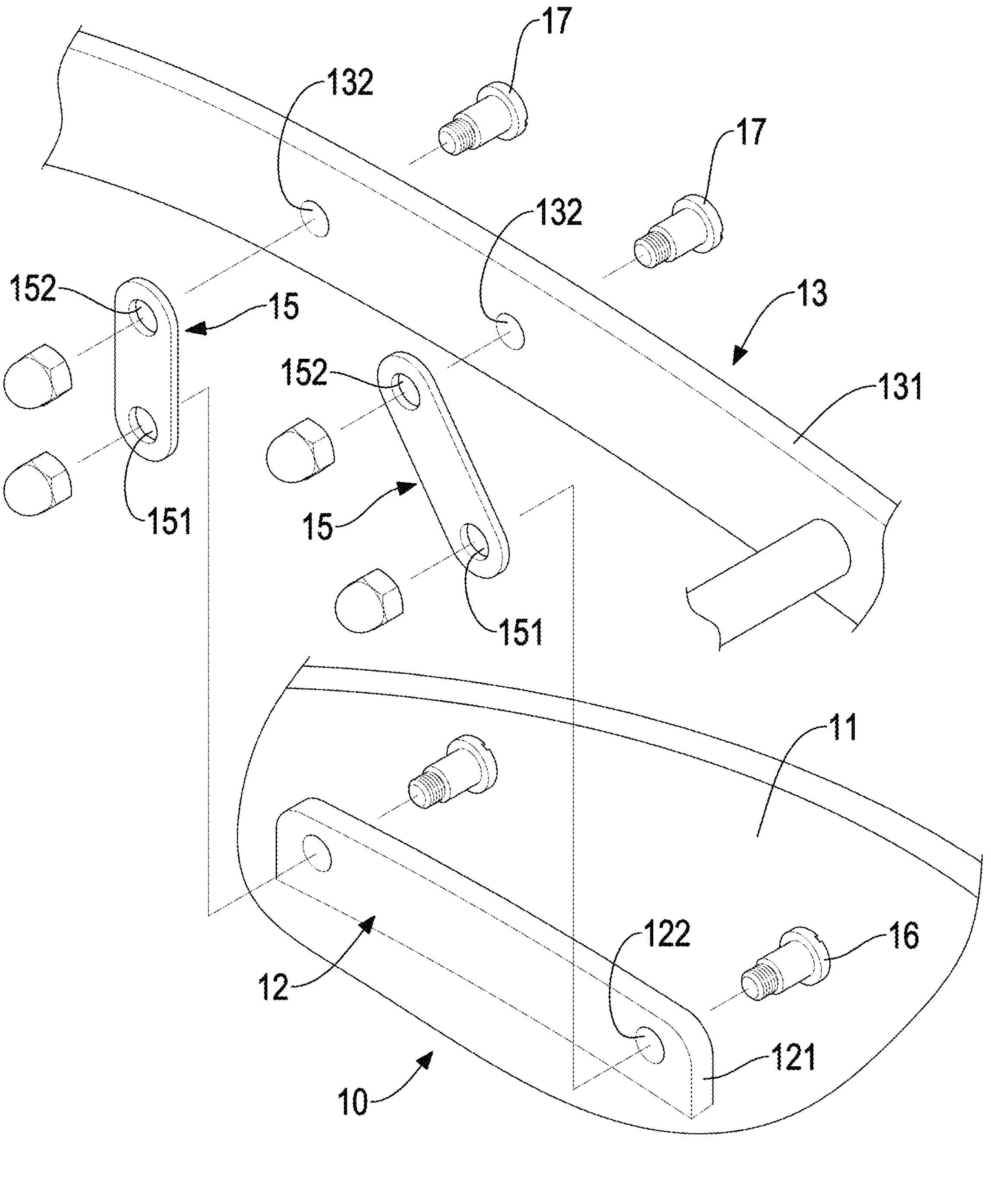
FIG. 4 is a partially exploded view of the lid device in FIG. 1.
Figure 5:
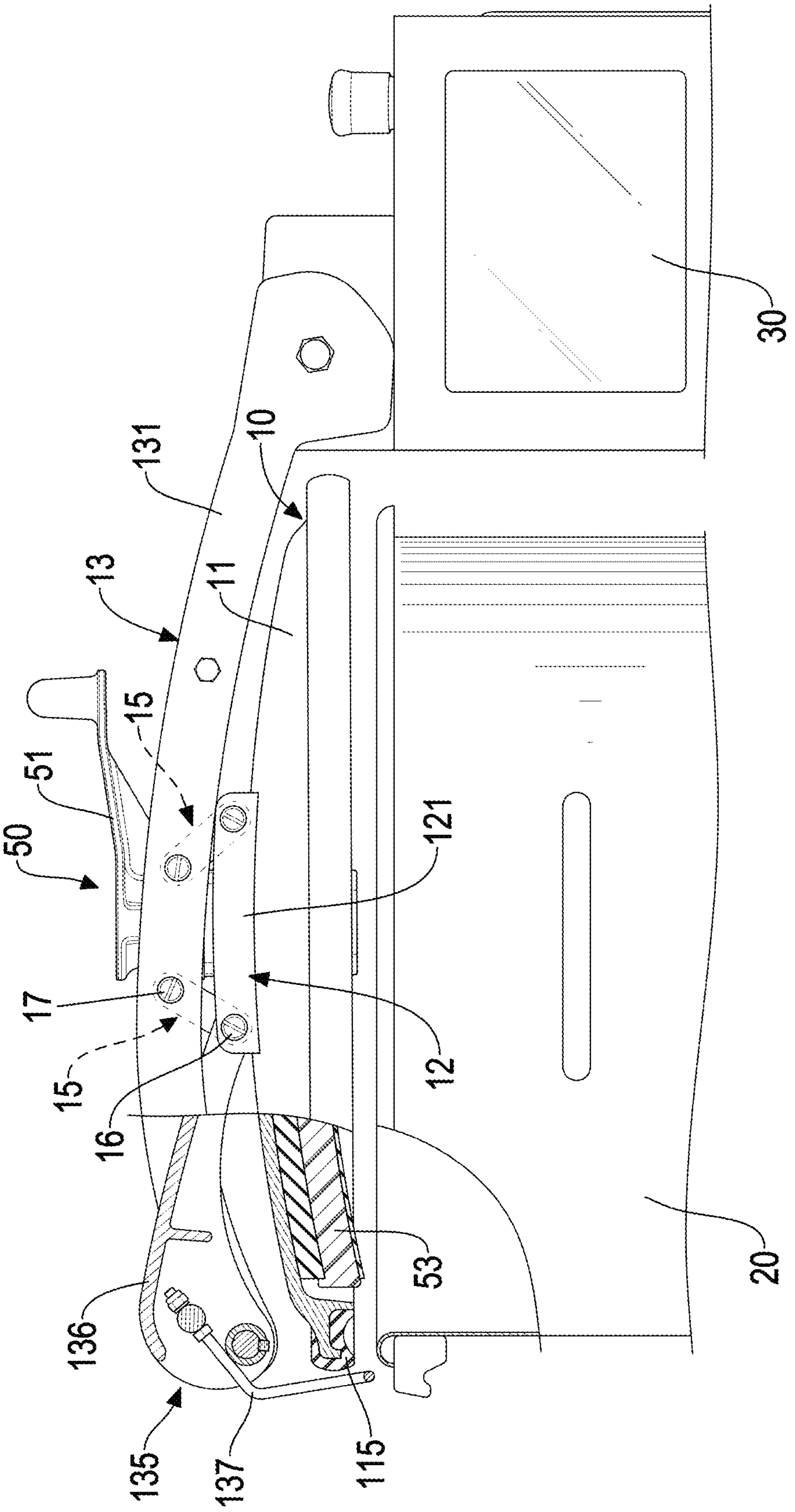
FIG. 5 is an enlarged operational side view in partial section of the lid device in FIG. 1 and shows that an action of closing the lid device.
Figure 6:
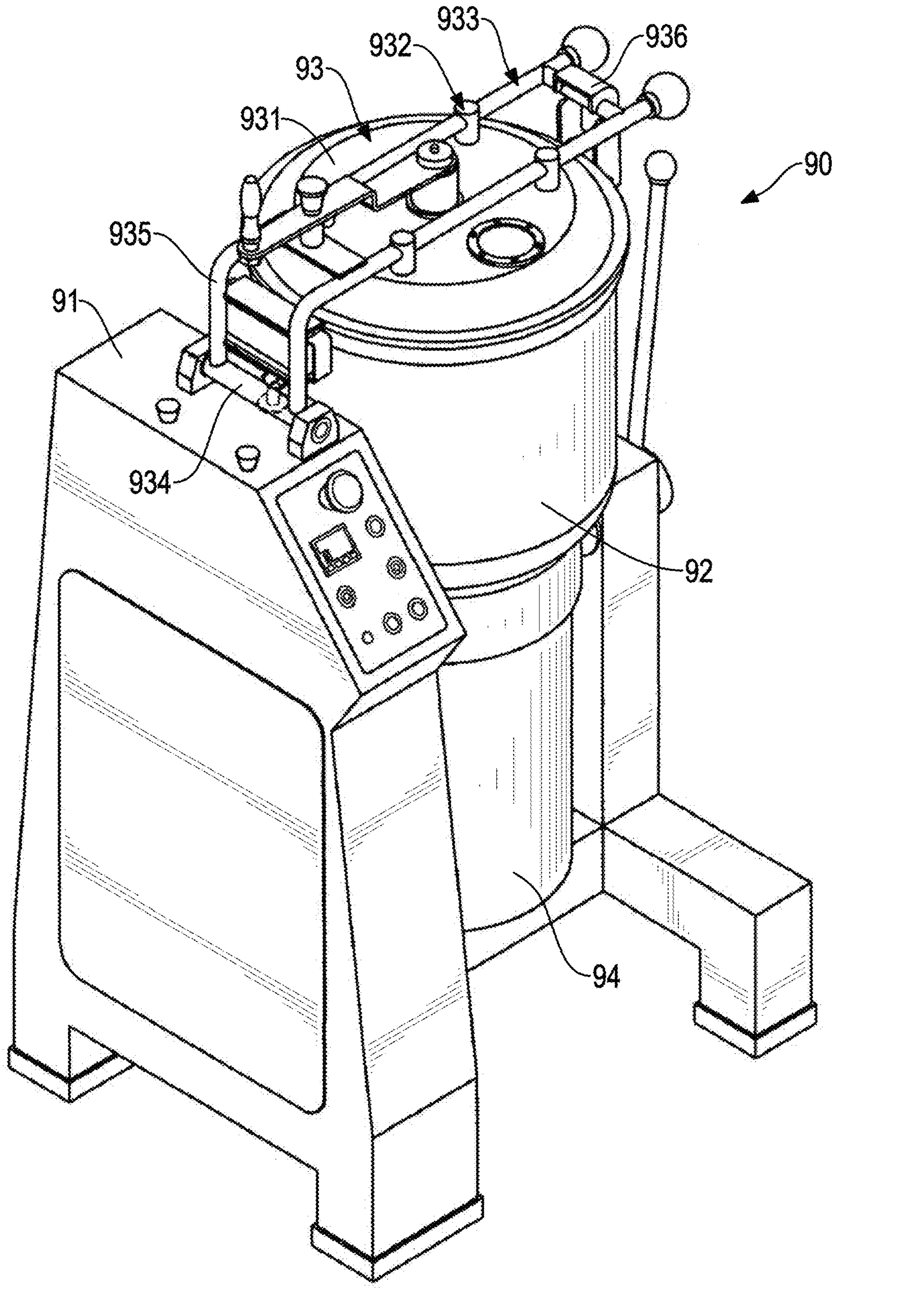
FIG.6 PRIOR ART
FIG. 6 is a vertical cutter mixer in accordance with the prior art.

With reference to FIGS. 3 to 5, the lid body 11 and the support member 13 are connected by the linking members 15 and each linking member 15 is pivotable relative to the holder 12 and is pivotable relative to the support member 13. When the lid device 10 pivots downwardly relative to the side stand 30 around a pivot shaft disposed between the support member 13 and the side stand 30, the lid body 11 is subjected to gravity to swing relative to the support member 13. As a result, the lid body 11 contacts the barrel edge of the mixing barrel 20 almost horizontally. The lid device 10 is subjected to a uniform force during closing, thereby enhancing the closing tightness of the lid device 10.

What is claimed is:

1. A lid device of a vertical cutter mixer configured to close a top of a mixing barrel and configured to be pivotably connected to a side stand next to the mixing barrel, the lid device comprising:

a lid body comprising a holder at a top of the lid body;

a support member configured to be pivotably connected to the side stand via an end of the support member; and at least one linking member disposed between the lid body and the support member; wherein each of the at least one linking member is connected to the holder via a first pivot member and is pivotable relative to the holder around the first pivot member; and each of the at least one linking member is connected to the support member via a second pivot member and is pivotable relative to the support member around the second pivot member.

2. The lid device as claimed in claim 1, wherein the at least one linking member includes multiple said linking members spaced apart from one another.

3. The lid device as claimed in claim 2, wherein the holder comprises multiple first through holes spaced apart from one another;

the support member comprises multiple second through holes spaced apart from one another;

each of the multiple linking members has a first connecting hole and a second connecting hole spaced apart from each other;

each of the multiple linking members is pivotably connected to the holder via the first pivot member extending through the first connecting hole of the linking member and one of the first through holes of the holder; and each of the multiple linking members is pivotably connected to the support member via the second pivot member extending through the second connecting hole of the linking member and one of the second through holes of the support member.

4. The lid device as claimed in claim 1, wherein the at least one linking member includes two said linking members arranged along the support member at a spaced interval.

5. The lid device as claimed in claim 4, wherein a first distance between two ends of the two linking members connected to the support member is smaller than a second distance between two ends of the two linking members connected to the holder.

6. The lid device as claimed in claim 1, wherein the at least one linking member includes multiple linking members;

the holder comprises two mounting plates extending parallel to the support member and laterally spaced apart from each other;

the support member comprises two supporting arms extending away from the side stand and laterally spaced apart from each other; and each of the two mounting plates is connected to a respective one of the two supporting arms via two of the multiple linking members arranged along the support member at a spaced interval.

7. The lid device as claimed in claim 6, wherein two first through holes are formed through each of the two mounting plates and are arranged along the support member;

two second through holes are formed through each of the two supporting arms and are arranged along the support member;

each of the linking members has a first connecting hole and a second connecting hole spaced apart from each other;

each of the linking members is pivotably connected to one of the two mounting plates via the first pivot member extending through the first connecting hole of the linking member and one of the first through holes at the mounting plate; and each of the linking members is pivotably connected to one of the two supporting arms via the second pivot member extending through the second connecting hole of the linking member and one of the second through holes at the supporting arm.

8. The lid device as claimed in claim 7, wherein a distance between the two first through holes of each of the mounting plates is larger than a distance between the two second through holes of each of the supporting arms.

9. The lid device as claimed in claim 6, wherein the support member comprises a fastening member connected to the two supporting arms and is disposed at an end of the support member away from the side stand.

10. The lid device as claimed in claim 1, wherein the lid device comprises a sealing member combined with and surrounding a rim of the lid body.

11. The lid device as claimed in claim 2, wherein the lid device comprises a sealing member combined with and surrounding a rim of the lid body.

12. The lid device as claimed in claim 3, wherein the lid device comprises a sealing member combined with and surrounding a rim of the lid body.

13. The lid device as claimed in claim 4, wherein the lid device comprises a sealing member combined with and surrounding a rim of the lid body.

14. The lid device as claimed in claim 5, wherein the lid device comprises a sealing member combined with and surrounding a rim of the lid body.

15. The lid device as claimed in claim 6, wherein the lid device comprises a sealing member combined with and surrounding a rim of the lid body.

16. The lid device as claimed in claim 7, wherein the lid device comprises a sealing member combined with and surrounding a rim of the lid body.

17. The lid device as claimed in claim 8, wherein the lid device comprises a sealing member combined with and surrounding a rim of the lid body.

18. The lid device as claimed in claim 9, wherein the lid device comprises a sealing member combined with and surrounding a rim of the lid body.

* * * * *